US009507876B2

(12) United States Patent
Primke et al.

(10) Patent No.: US 9,507,876 B2
(45) Date of Patent: Nov. 29, 2016

(54) CONSTRUCTING QUERIES USING QUERY FILTERS ON ONLINE SOCIAL NETWORKS

(71) Applicant: Facebook, Inc., Menlo Park, CA (US)

(72) Inventors: Thorben Christopher Primke, San Francisco, CA (US); Barton Andrew Kiley, San Jose, CA (US); Taylor Dancy Rogalski, San Francisco, CA (US); Christine Morck Rode, San Francisco, CA (US); Andrew James Lyons, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 264 days.

(21) Appl. No.: 14/506,769

(22) Filed: Oct. 6, 2014

(65) Prior Publication Data
US 2016/0098493 A1    Apr. 7, 2016

(51) Int. Cl.
*G06F 17/30* (2006.01)
*H04L 29/06* (2006.01)

(52) U.S. Cl.
CPC ... *G06F 17/30958* (2013.01); *G06F 17/30424* (2013.01); *G06F 17/30864* (2013.01); *G06F 17/30867* (2013.01); *H04L 65/403* (2013.01)

(58) Field of Classification Search
CPC ............................................. G06F 17/30867
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |

(Continued)

*Primary Examiner* — Mohammad S Rostami
(74) *Attorney, Agent, or Firm* — Baker Botts L.L.P.

(57) ABSTRACT

In one embodiment, a method includes receiving a first search query including a selection of a first query-domain. The first query-domain may correspond to a first object-type. The method includes identifying a first set of objects of the plurality of objects matching the first object-type. The method includes sending a first search-results page responsive to the first search query. The first search-results page may include references to one or more of the identified objects from the first set of objects and one or more query-filter elements. Each query-filter element may correspond to a query-filter associated with the first query-domain. Each query-filter element may be activatable to apply the associated query-filter to the identified objects. The method includes receiving a second search query including a selection of one or more of the query-filters in response to the first user activating the corresponding query-filter elements.

20 Claims, 16 Drawing Sheets

(56) References Cited

U.S. PATENT DOCUMENTS

| | | |
|---|---|---|
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2 | 7/2014 | Lee |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1* | 8/2006 | Richardson ......... G06F 17/3064 |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippuri |
| 2010/0049802 A1 | 2/2010 | Raman |
| 2010/0057723 A1 | 3/2010 | Rajaram |
| 2010/0125563 A1* | 5/2010 | Nair ....................... G06Q 30/02 707/709 |
| 2010/0125604 A1* | 5/2010 | Martinez ........... G06F 17/30867 707/784 |
| 2010/0179929 A1 | 7/2010 | Yin |
| 2010/0228744 A1 | 9/2010 | Craswell |
| 2010/0235354 A1 | 9/2010 | Gargaro |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1* | 6/2011 | Wable ............... G06F 17/30867 707/737 |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2012/0059708 A1 | 3/2012 | Galas |
| 2012/0072432 A1* | 3/2012 | Crosa ................ G06F 17/30867 707/748 |
| 2012/0136852 A1 | 5/2012 | Geller |
| 2012/0158720 A1* | 6/2012 | Luan ................. G06F 17/30867 707/732 |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1* | 10/2012 | Narayanan ........ G06F 17/30867 707/741 |
| 2012/0278127 A1 | 11/2012 | Kirakosyan |
| 2012/0284329 A1 | 11/2012 | Van Den Oord |
| 2012/0311034 A1 | 12/2012 | Goldband |
| 2013/0031106 A1 | 1/2013 | Schechter |
| 2013/0031113 A1* | 1/2013 | Feng .................. G06F 17/3087 707/755 |
| 2013/0041876 A1 | 2/2013 | Dow |
| 2013/0066876 A1 | 3/2013 | Raskino |
| 2013/0086057 A1* | 4/2013 | Harrington ....... G06F 17/30864 707/732 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0226918 A1 | 8/2013 | Berkhim |
| 2013/0246404 A1 | 9/2013 | Annau |
| 2013/0254155 A1* | 9/2013 | Thollot ............. G06F 17/30528 707/602 |

\* cited by examiner

CONSTRUCTING QUERIES USING QUERY FILTERS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may generate structured queries that include references to particular social-graph elements. These structured queries may be generated, for example, in response to a text query provided by a user, or generated as default queries. By providing suggested structured queries to a user's text query, the social-networking system may provide a powerful way for users of an online social network to search for elements represented in a social graph based on their social-graph attributes and their relation to various social-graph elements.

In particular embodiments, the social-networking system may construct queries using query-filters. The social-networking system may allow a user to input a search query using a multi-step implementation and a graphical interface to select query domains and apply query filters.

When performing a search query, the user may select query element (e.g., icons, menu selections, etc.) to apply particular filters to a search query. For example, the query interface (e.g., a query-initiation page) may be populated with icons for selecting a particular domain (e.g., places, people, photos) to search (referred to herein as query-domain elements). After a domain is selected, the user may then select one or more query-filter elements to be applied to the search query. As an example and not by way of limitation, a user may select the domain "People", and then be taken to a people search-results page. The people search may have a variety of filter options related to users, for example, location, friends, school, which may be selected as "San Francisco", "Friends of friends", and "Stanford University". Once inputted, a search, for example a structured query comprising references to particular social-graph elements, may be executed and matching results presented to the user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
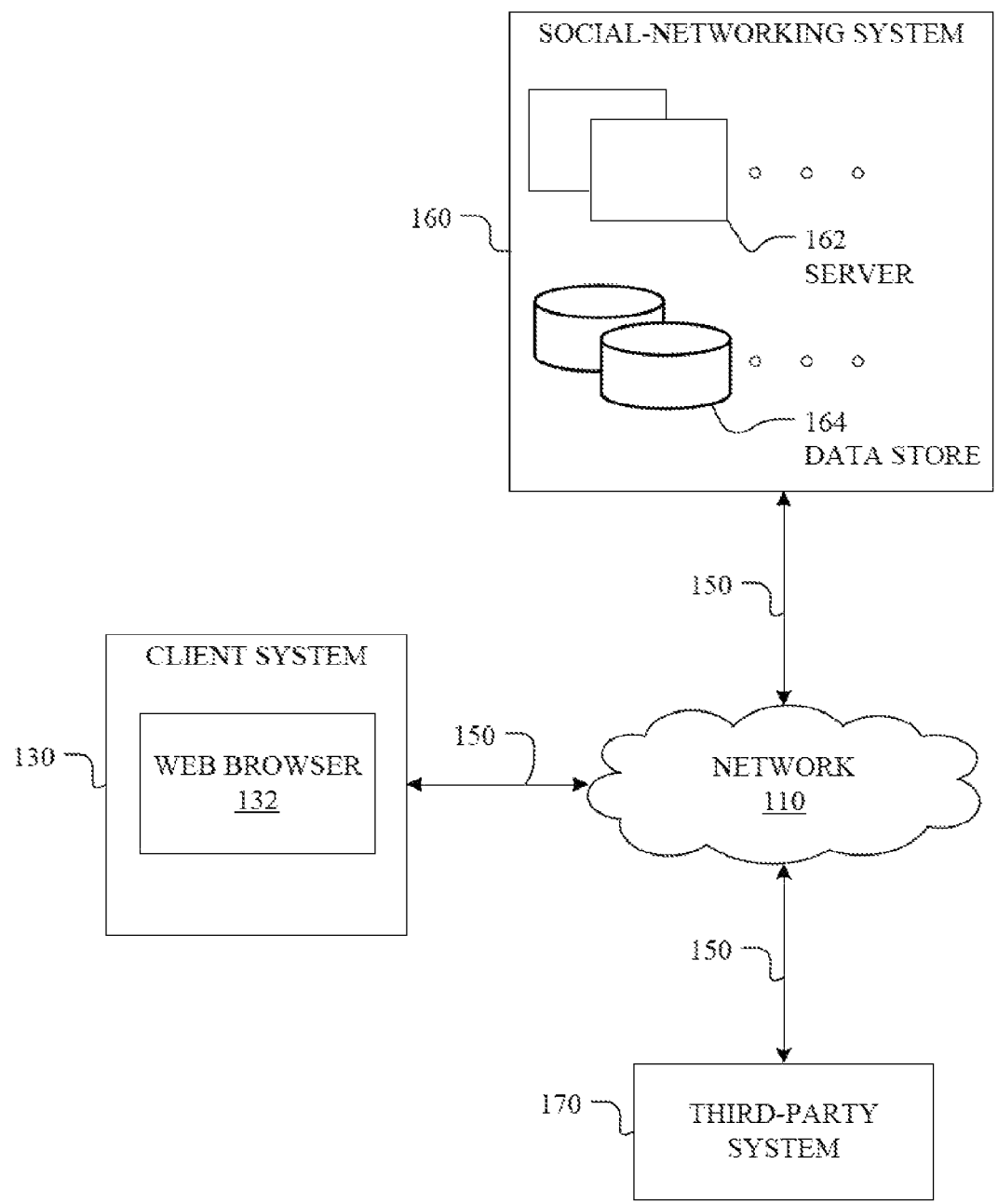
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
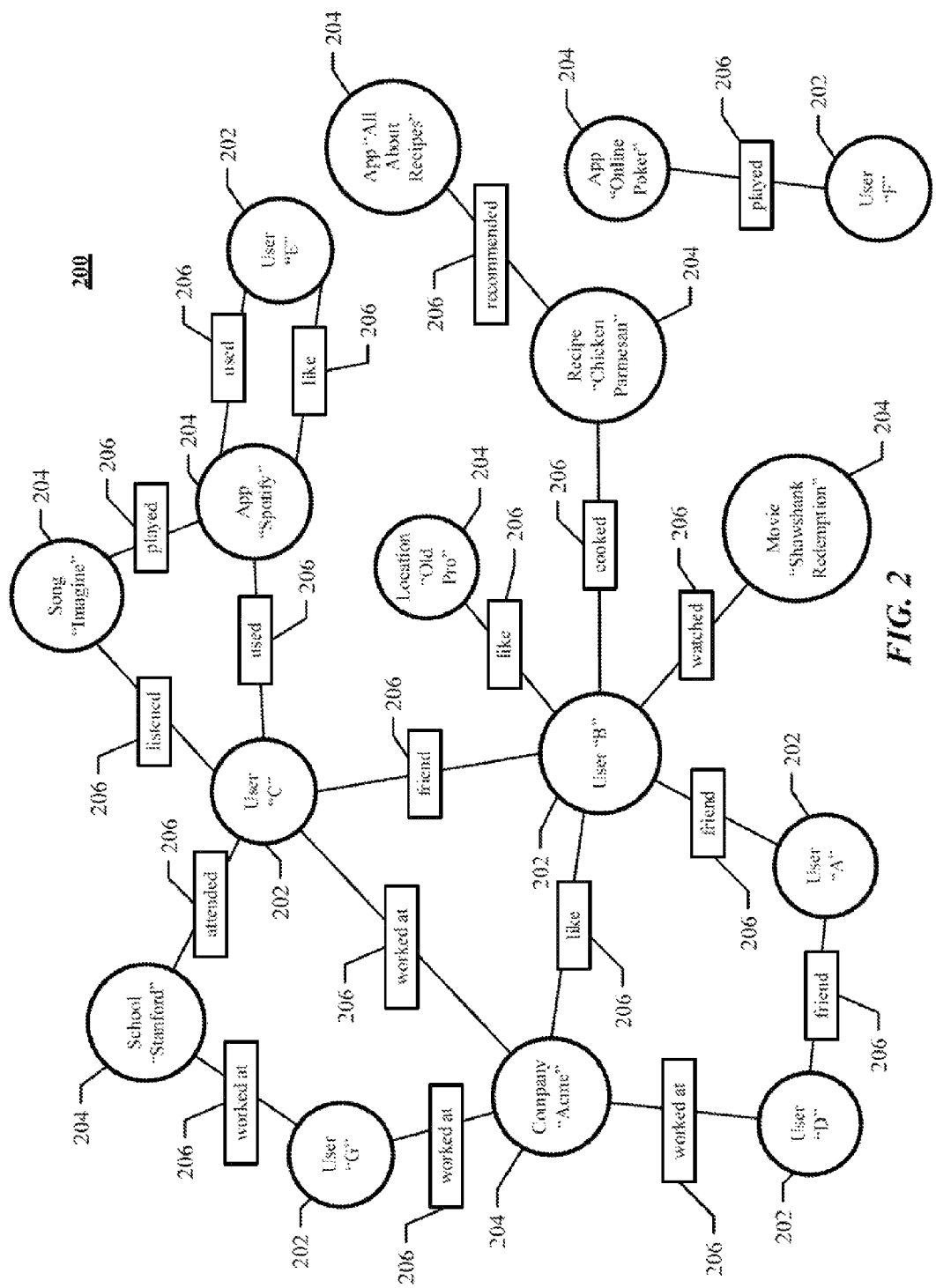
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-type

Figure 3:
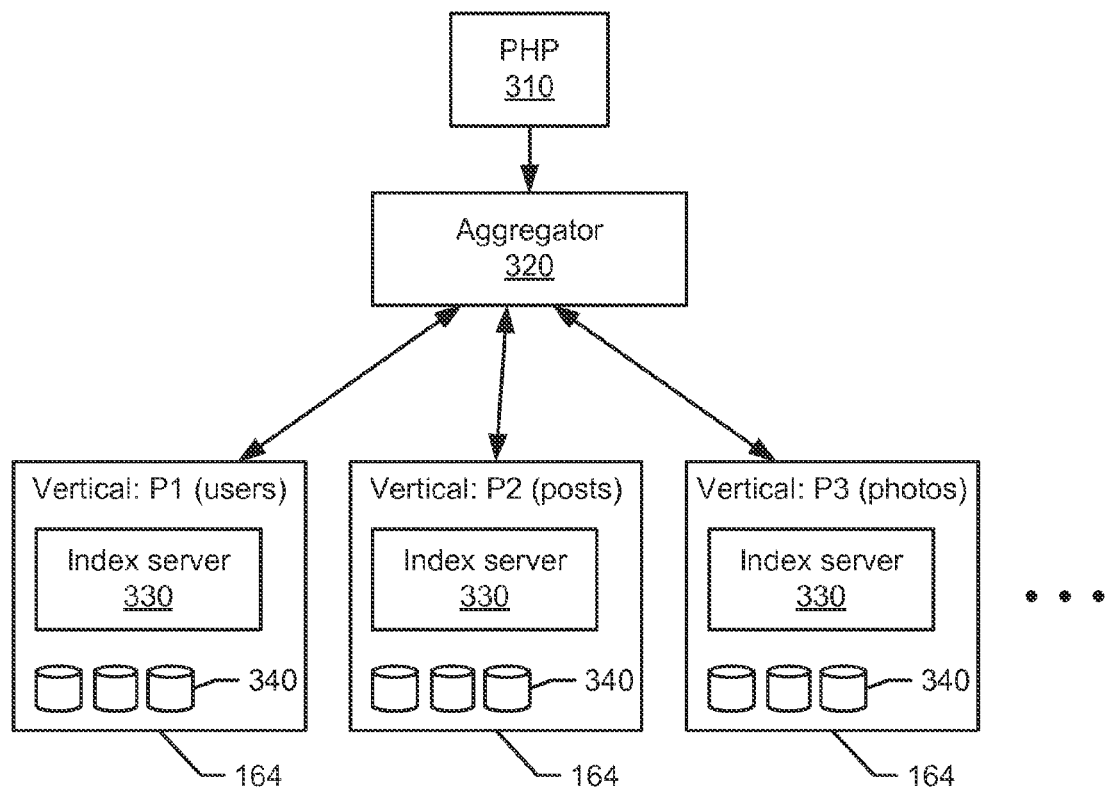
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170).

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 4:
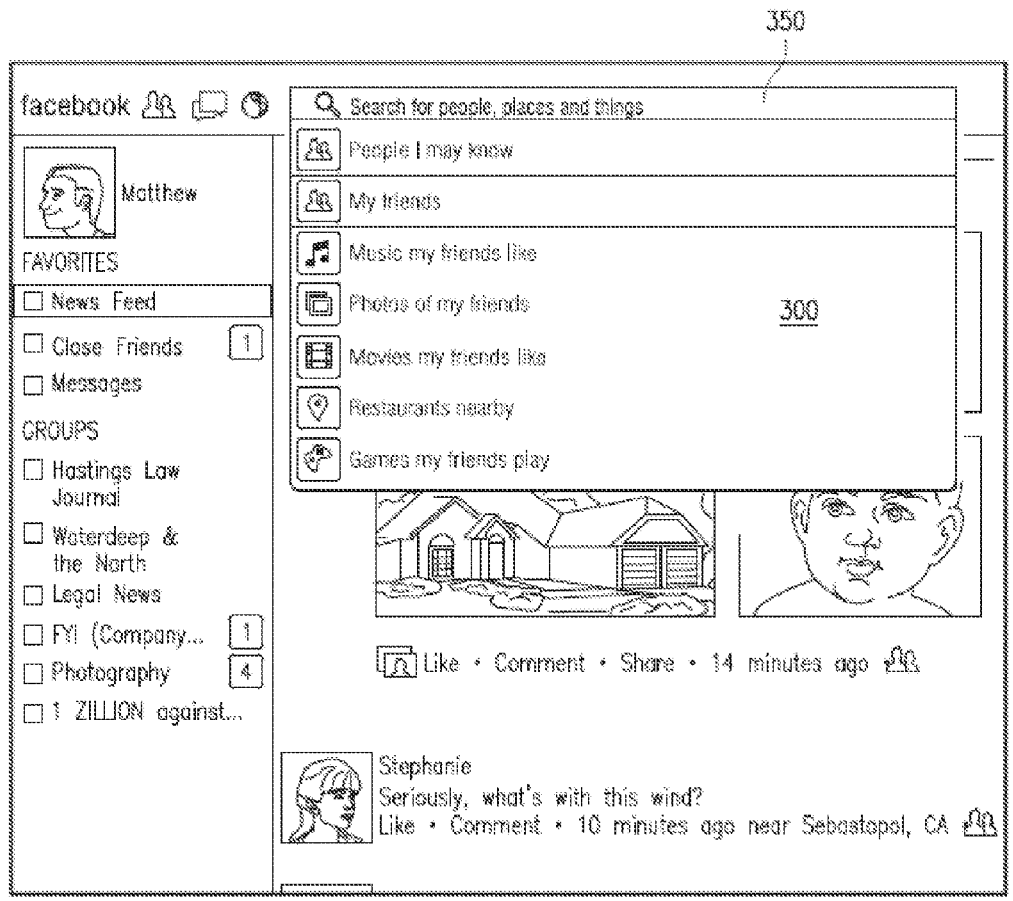
FIG. 4 illustrates an example page of an online social network.

FIG. 4 illustrates an example page of an online social network. In particular embodiments, a user may submit a query to the social-networking system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Figure 5A:
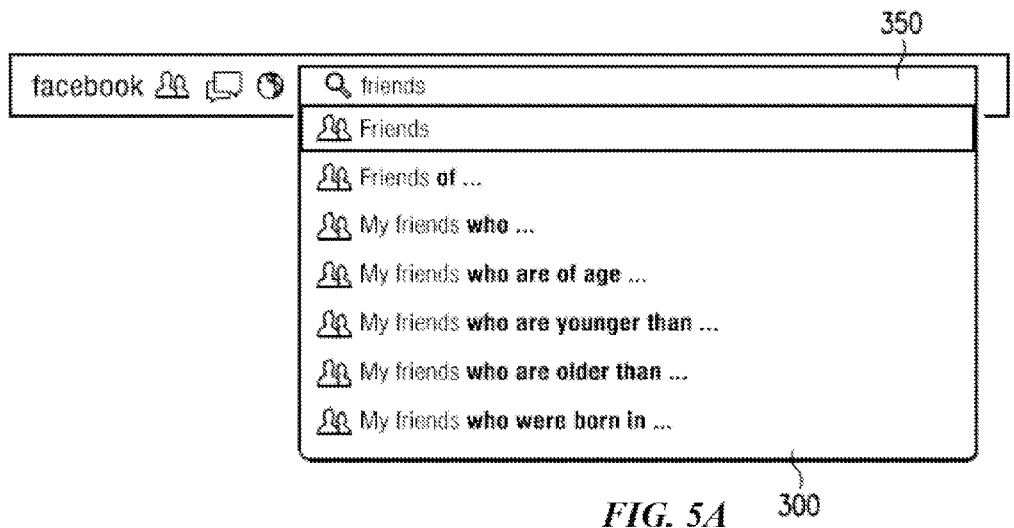
FIGS. 5A-5B illustrate example queries of the social network.
Figure 5B:
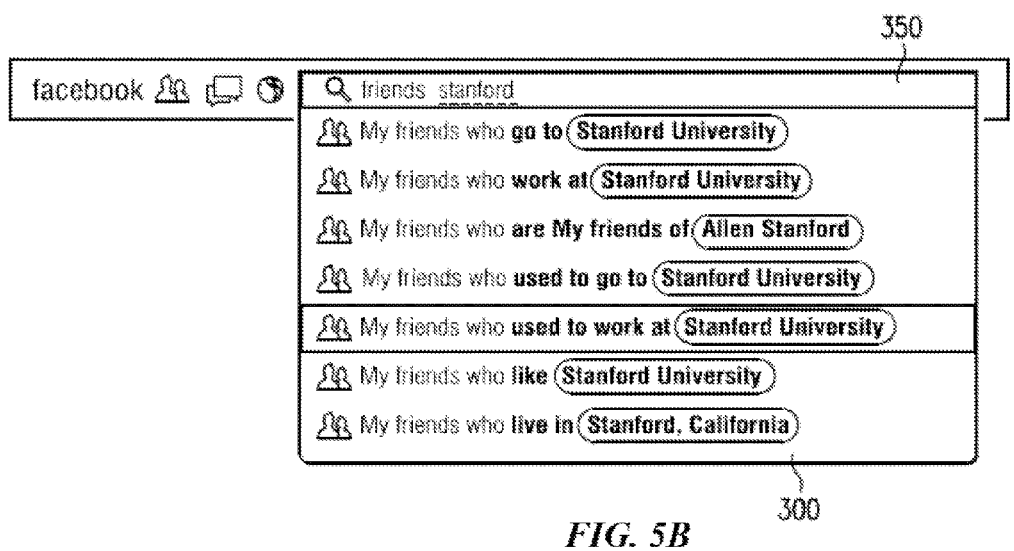

FIGS. 5A-5B illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 5A-5B illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 5A-5B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 5A-5B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", or "/search/me/friends/[node ID for Stanford University]/students/ever-past/intersect", which could be executed as a query in a social-graph database). Although this disclosure describes receiving particular queries in a particular manner, this disclosure contemplates receiving any suitable queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, U.S. patent application Ser. No. 13/732,101, filed 31 Dec. 2012, and U.S. patent application Ser. No. 13/887,015, filed 3 May 2013, each of which is incorporated by reference.

Constructing Queries Using Query Filters

FIGS. 6A-6F and 7A-7C illustrate example screen shots of queries being constructed using filters. In particular embodiments, social-networking system 160 may allow a user to input a search query using a multi-step implementation and a graphical interface to select query-domains and apply query-filters. In order to improve the process for inputting structured search queries, rather than having the user input a text string into a query field (which may then be parsed by social-networking system 160 to generated suggested structured queries), the user may constructed a structured query by selecting query elements (e.g., query-domains and query-filters, as discussed below) via a menu/icon user interface. This may be particularly useful in the mobile device context, where inputting text strings may be slow and/or difficult. Furthermore, this may be useful for providing structured search functionality to non-English speaking users, where existing grammar models for parsing text queries do not exist for the user's particular language. For example, a menu/icon user interface for selecting query elements can be provided in a first language, however the search can be performed based on a second language's grammar model, for example, English. In other words, users may be able to construct queries by selecting query elements with descriptions in their native language, while the processing of the query by the social-networking system 160 may still construct the query using an English-based grammar model to generate, for example, a structured query and a corresponding query command. This functionality may minimize or eliminate the need to generate grammar models for other countries and languages. In particular embodiments, the user may select a particular domain (e.g., places, people, photos) to be searched, then select one or more query-filters to be applied in order to construct a search query. As an example and not by way of limitation, a user may opt to perform a places search by selecting the places query-domain. The places query-domain may have a plurality of filter options, for example "location", "type", "sub-type", and "hours", which the user may select as "Palo Alto", "restaurants", "Chinese cuisine", "open now". This selection of query-filters may correspond to a particular structured query, such as "Chinese restaurants in Palo Alto, California that are open now." The social-networking system 160 may then perform a search based on the selected query-domain and query-filters. This may be done, for example, by processing the corresponding structured query (e.g., generating a query command based on the structured query, such as <search/[open now]/places-open-at/[Palo Alto]/places-in/[Chinese restaurant]/places/intersect>, which can be executed by a search engine of social-networking system 160). As another example and not by way of limitation, a user may opt to perform a people (or user) search by selecting the people query-domain. The people query-domain may have a plurality of filter options, for example "gender", which the user may select as "female", etc. The social-networking system 160 may then perform a search based on the selected query-domain and query-filters. In response to the query, social-networking 160 may then send to the client device 130 of the querying user a search-results page comprising references to the matching objects. The search-results page may also contain additional query-filter elements that the querying user can select to further refine the search query, or to pivot the search query (e.g., query a different domain). In particular embodiments, the query-domain may include users (also referred to as "people"), photos, posts, pages, applications, events, locations (also referred to as "places"), user groups, applications (also referred to as "apps"), messages, or other suitable object-types associated with the online social network. In particular embodiments, the "people" domain may include the following filters (sub-filters in parenthesis): location (lives in; lives near; from; places lived); friends; work (employer; position; location; time period); education (concentration; degree type; class year); gender; relationship status; age/year born (age; birth year); languages; religious views; political views; likes and interests; places visited/check-ins (places visited; places checked in); member of a group (administrator; member); following people; apps liked/used (applications used; applications liked) or other suitable filters. In particular embodiments, the "photos" domain may include the following filters: taken by; location; tagged with a person; dated taken; liked/commented on by (liked by; commented on by); sort by (relevance; newest; oldest; likes comments) or other suitable filters. In particular embodiments, the "posts" domain may include the following filters: posted/shared by (author; shared by); tagged with (media tag; with tag; mention); date posted; liked/commented on by (commented on by; liked by); sort by (relevance; newest; oldest; likes; comments); location; post type; link URL; language; posted to (timeline; group; event) or other suitable filters. In particular embodiments, the "pages" domain may include the following filters: liked by; page type or other suitable filters. In particular embodiments, the "places" domain may include the following filters: place type (location; cuisine; rating price; liked/visited by; sort by); location; liked/visited by (visited by; liked by); sort by (relevance; distance; likes; ratings) or other suitable filters. In particular embodiments, the "groups" domain may have the following filters: description; members; privacy or other suitable filters. In particular embodiments, the "apps" domain may have the following filters: app type; liked/used by (liked by; used by) or other suitable filters. In particular embodiments, the "events" domain may have the following filters: event date; location; guests and organizers (host; member; invitee) or other suitable filters. Although this disclosure describes constructing queries using query filters in a particular manner, this disclosure contemplates constructing queries using query filters in any suitable manner.

Figure 6A:
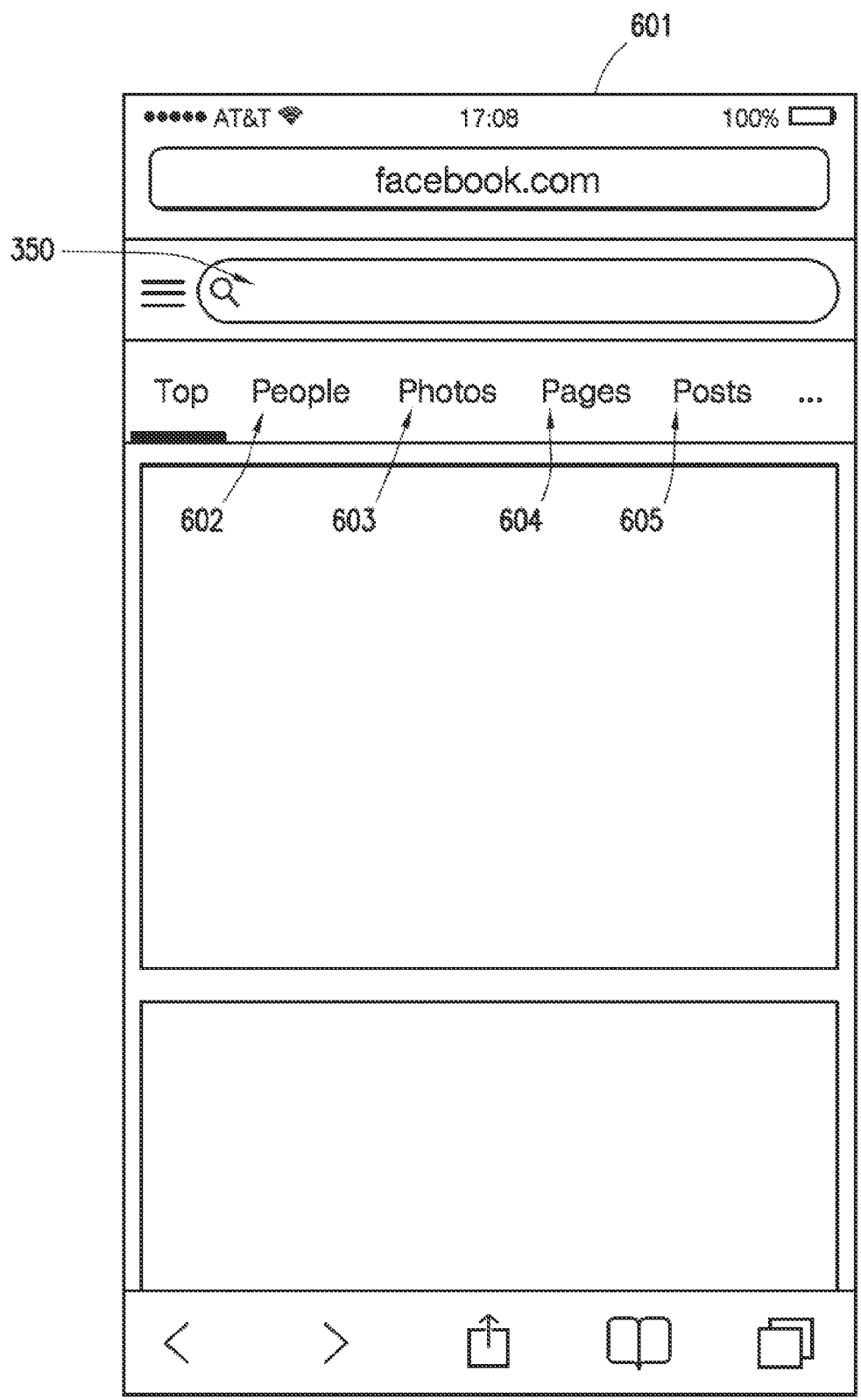
FIGS. 6A-6F illustrate example screen shots of queries being constructed using filters.

In particular embodiments, social-networking system 160 may receive, from a client device 130 of a user, a first search query. The first search query may include a selection of a query-domain, and the query-domain may correspond to a first object-type. The object-type may be, for example, users (also referred to as "people"), photos, posts, pages, applications, events, locations (also referred to as "places"), user groups, applications (also referred to as "apps") or other suitable object-types associated with the online social network. In particular embodiments, the social-networking system 160 may provide a query-initiation page (which may simply be the null state for the search query functionality), which may include one or more query-domain elements corresponding to one or more query-domains, respectively, and possibly one or more query-filters elements (discussed in more detail below). Each query-domain element may be activatable (e.g., the user may tap, click, etc.) to generate a search query of the query-domain corresponding to that query-domain element. In particular embodiments, receiving the first search query can include receiving an indication that the first user has activated a first query-domain element corresponding to the first query-domain. The query-initiation page may be sent to the client device 130 responsive to a selection of a query field 350 by the user. As an example and not by way of limitation, social-networking system 160 may send a query-initiation page to a client device 130 responsive to the user selecting a query field 350. The query-initiation page may have a plurality of query-domain elements corresponding to one or more query-domains, respectively, including for example, "users", "photos", and "locations". As an example and not by way of limitation, a user may access a query-initiation page and be presented with a plurality of query-domain elements, each represented as a selectable icon on the page. These icons may read "People," "Photos," "Locations," etc. The user may then tap one of the icons to query for objects of the object-type associated with the selected query-domain. For example, the social-networking system 160 may receive an indication that the user has selected the query-domain element associated with "Locations". Social-networking system 160 may then query the vertical 164 corresponding to the locations object-type. As an example and not by way of limitation, FIG. 6A illustrates a query-initiation page 601. The query-initiation page 601 includes a query-field 350 and a plurality of query-domain elements 602-605. The "people" query-domain element 602, "photos" query-domain element 603, "pages" query-domain element 604, and "posts" query-domain element 605 are associated with the object-types "people" (also referred to as "users"), "photos", "pages", and "posts", respectively. In particular embodiments, the query-initiation page may include additional search queries (not shown), for example, recent searches performed by the user or recently used query-filter elements (as described in greater detail below). In particular embodiments suggestions in the search results can be used to actively prompt the user to add filters. For example, if the user types "John Smith photo" the social-networking system may suggest "Photos taken by John Smith", or "Photos tagged with John Smith". Although this disclosure describes receiving a first query in a particular manner, this disclosure contemplates receiving a first query in any suitable manner.

In particular embodiments, social-networking system 160 may identify, responsive to the first search query, a first set of objects of the plurality of objects matching the first object-type (i.e., the object-type corresponding to the selected query-domain element). Each of the identified objects may correspond to a second node within a threshold degree of separation of the first node. The threshold degree of separation may be, for example, one, two, three, all, or other suitable degrees of separation. As an example and not by way of limitation, in response to a first user selecting a query domain corresponding to a user object-type, social-networking system 160 may identify user nodes 202 corresponding with users "John Smith" and "Jane Doe", who may be connected to the first user by one degree of separation through a "friend" edge 206. In some embodiments, the people search-results page may default to show "People you may know," or another suitable query. In particular embodiments, social-networking system 160 may identify the first set of objects by searching a vertical 164 to identify a plurality of objects in the vertical 164 that corresponds to the second node within a threshold degree of separation of the first node. The vertical 164 may be one of a plurality of verticals 164, each vertical 164 storing objects of a particular object-type. As an example and not by way of limitation, social-networking system 160 may search a vertical 164 associated with "locations" in response to a first user selecting a query domain corresponding to a "location" object-type. The social-networking system 160 may identify a concept node 204 associated with "Big Jim's Pizzeria", which is associated with the restaurant "Big Jim's Pizzeria", and may be connected to the user because the user has "liked" the restaurant. Although this disclosure describes identifying objects in a particular manner, this disclosure contemplates identifying objects in any suitable manner.

Figure 6B:
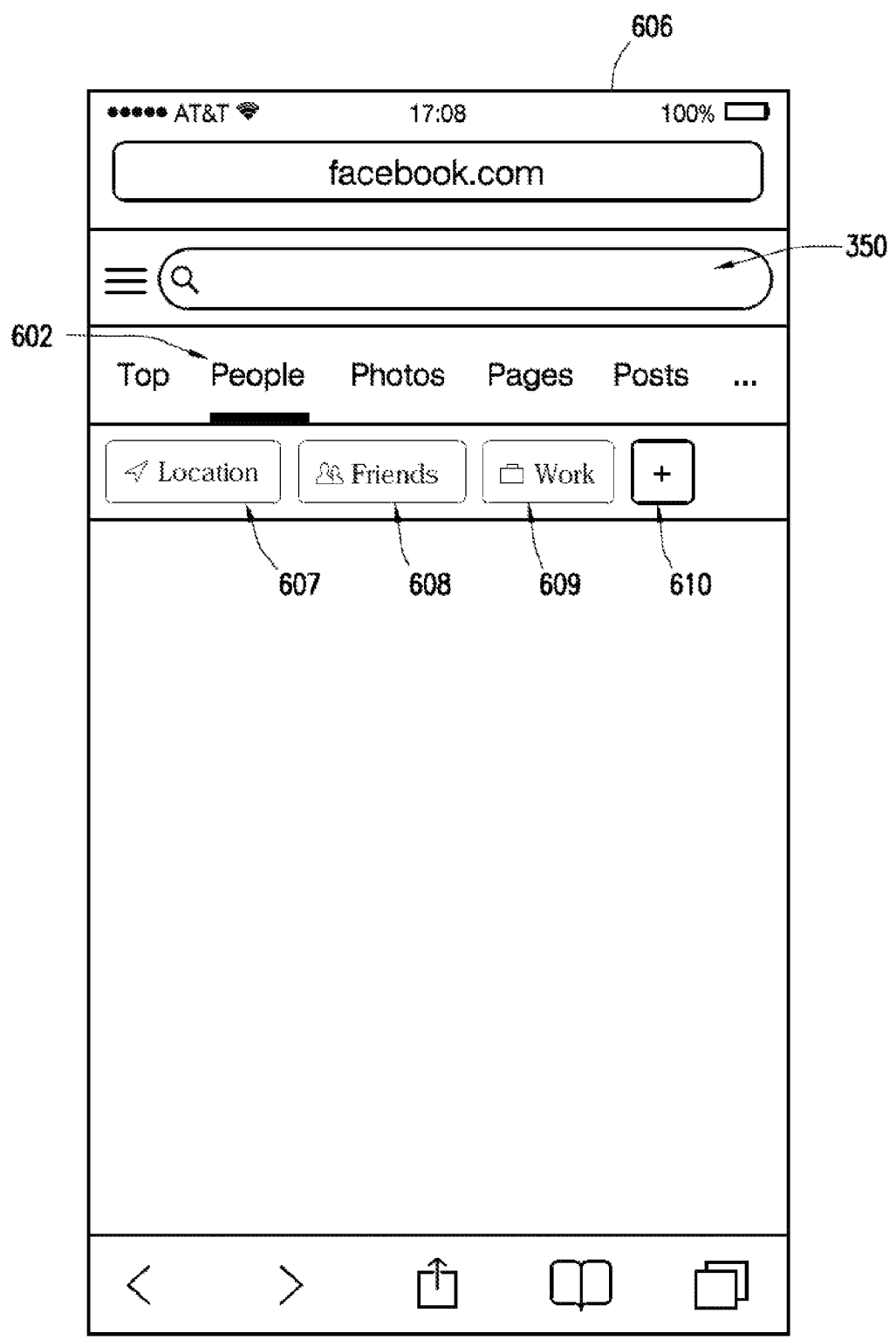
Figure 6C:
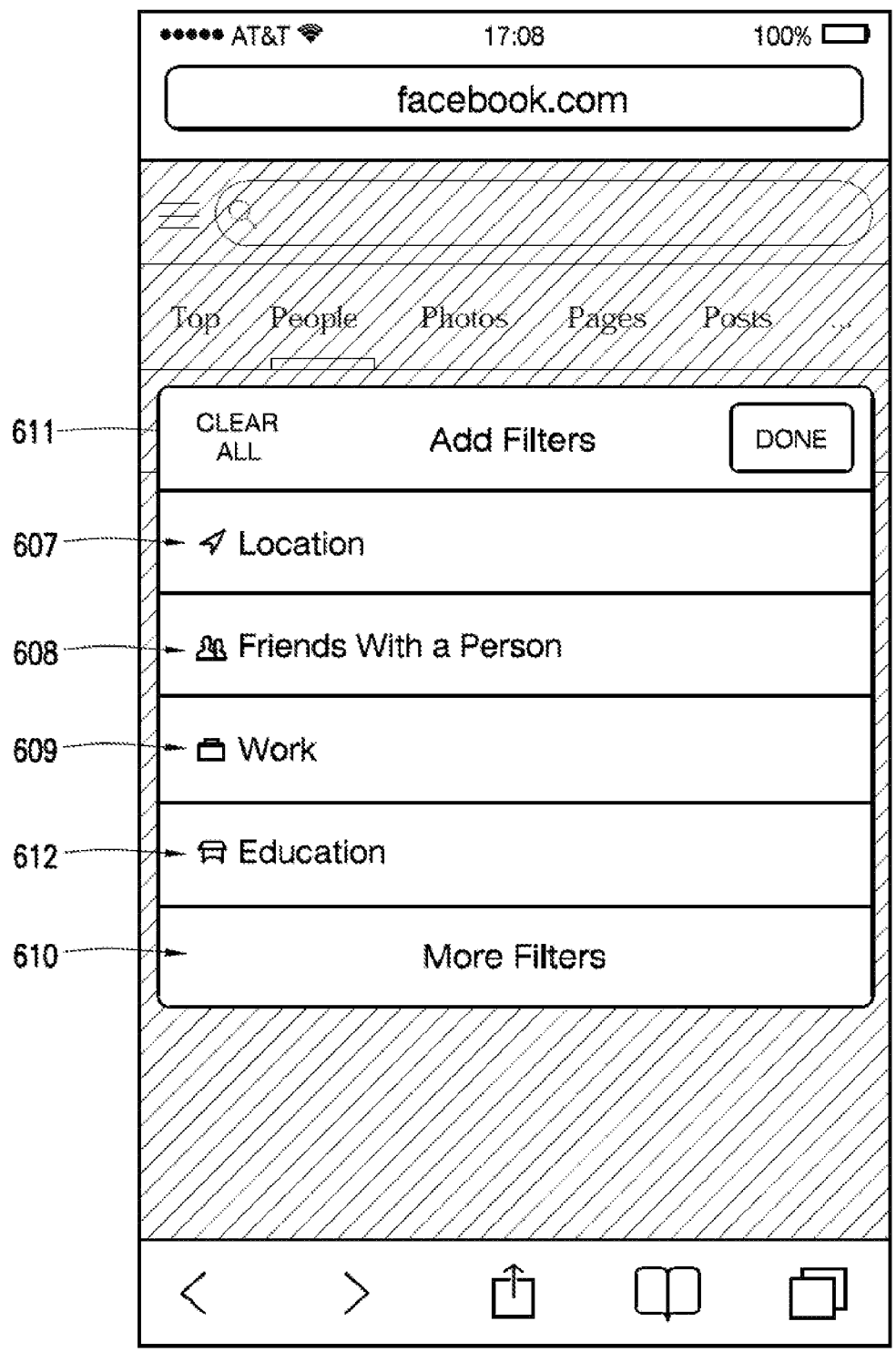
Figure 6D:
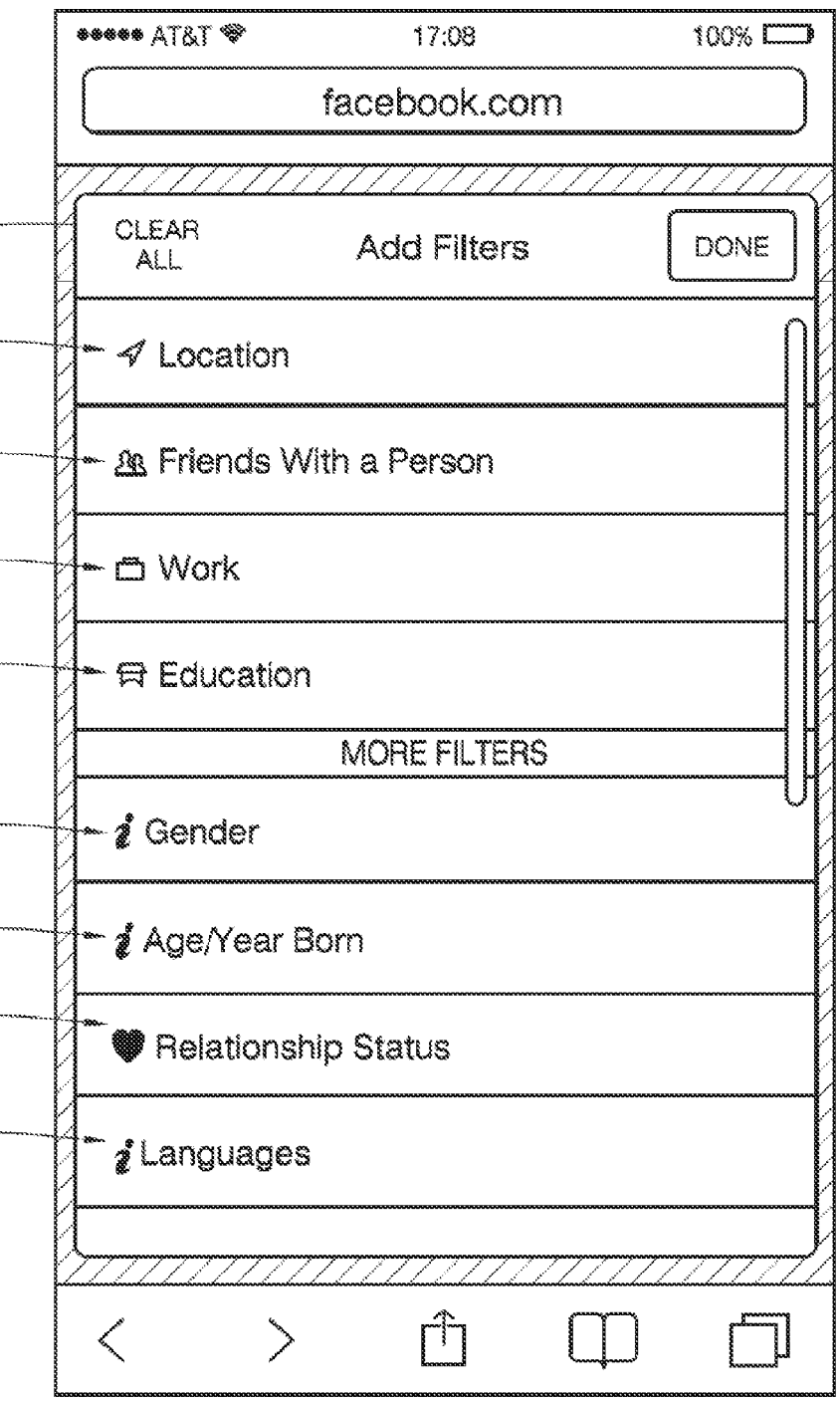
Figure 7A:
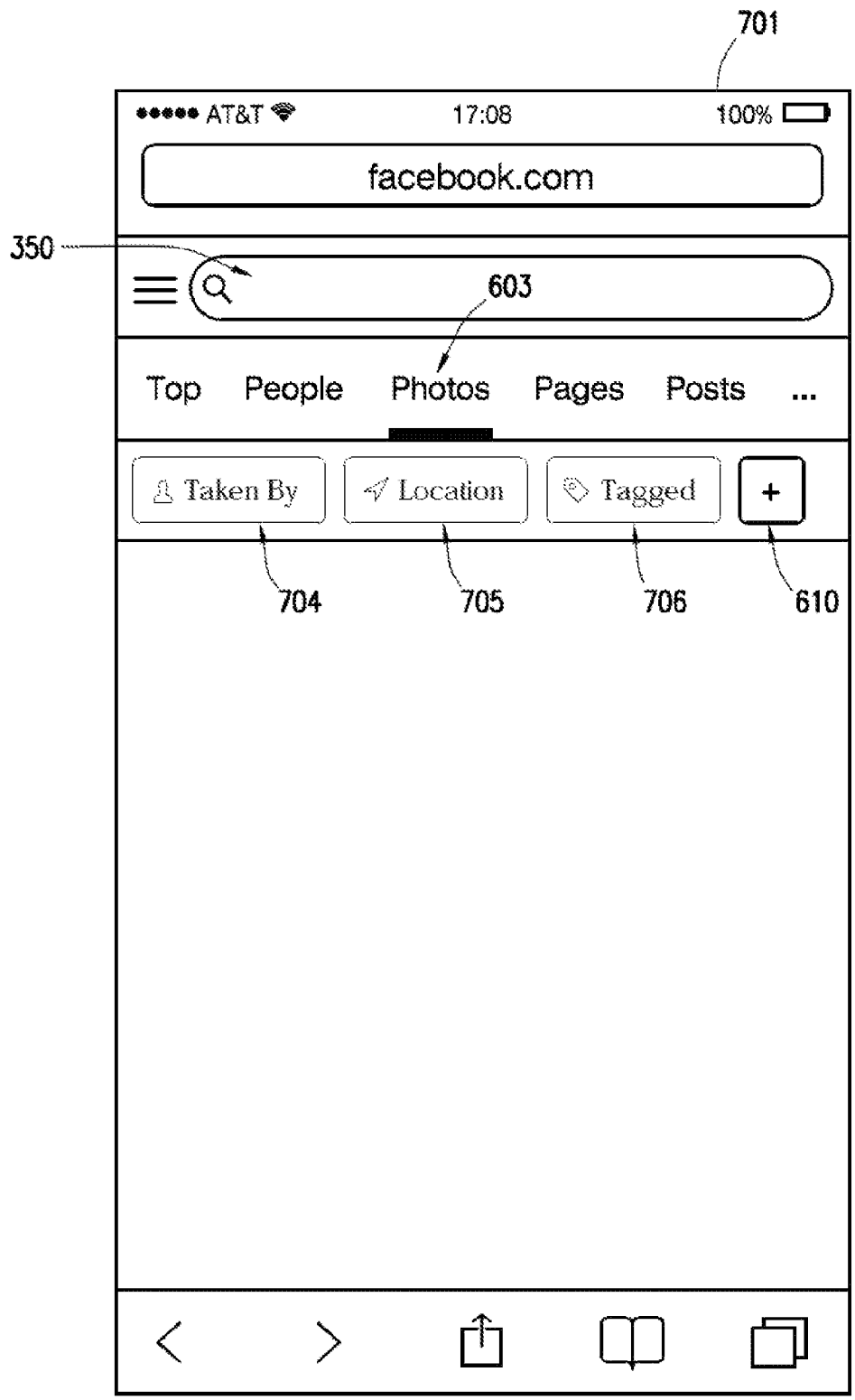
FIGS. 7A-7C illustrate additional example screen shots of queries being constructed using filters.
Figure 7B:
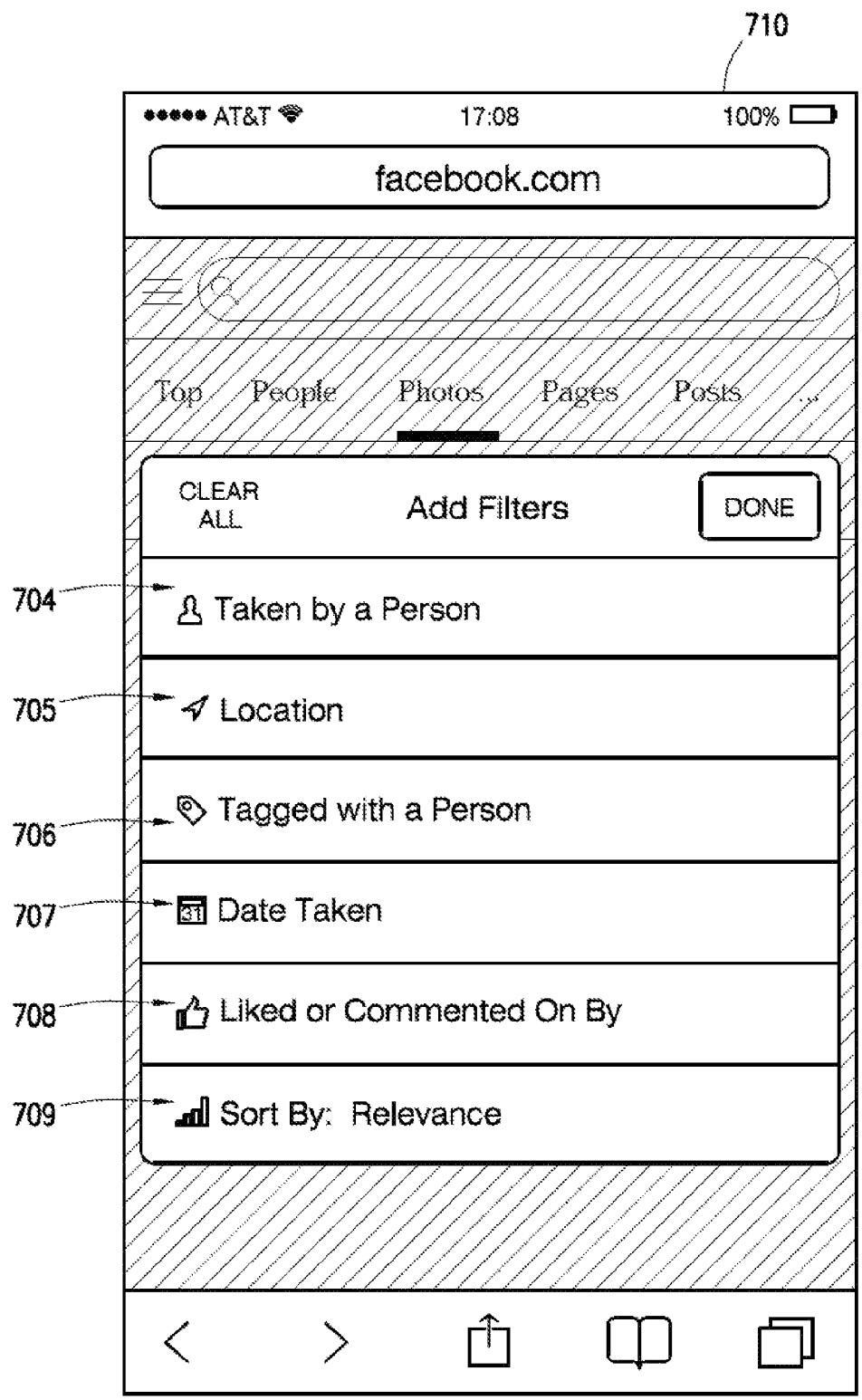

In particular embodiments, social-networking system 160 may send a first search-results page to the client device 130. The first search-results page may be sent responsive to the first search query (i.e., the search query corresponding to the previously selected query-domain and query-filter elements). The first search-results page may include references to one or more of the identified objects from the first set of objects, and one or more query-filter elements. In particular embodiments, the "people" search results page may default to show "People you may know", or another suitable query. Each query-filter element may correspond to a query-filter associated with the first query-domain. In some embodiments the filters may be references to particular social-graph entities, and some filters may be references to particular meta-data or object attributes. Each query-filter element may be activatable to apply the associated query-filter to the identified objects. Some of the query filters may be text entry and some of the query filters may be limited to a fixed list. Text-based or keyword query filters may accept multiple values. As an example and not by way of limitation, social-networking system 160 may send a first search-results page to the client device 130 in response to the user selecting the user query domain. The first search-results page may include user nodes 202 corresponding with user's "John Smith" and "Jane Doe", which were identified as described above. The search-results page may also include query-filter elements such as "Location", "Friends with a Person", "Work", or "Friends". The query-filters may be displayed in the order provided, or the query-filters may be ranked based on potential interest to the user. If the filters are ranked, they may be ordered dynamically. For example, the filters may be ranked higher if the user has selected the filter often. Alternatively a filter may be ranked higher is the likelihood of selecting a particular filter is higher. In particular embodiments, the first search-results page may further include an additional-filters element. The additional-filters element may be activatable to generate a user-interface including one or more query-filter elements of the first search-results page and one or more additional query-filter elements. Continuing the previously presented example, in response to the first user selecting an additional-filters element, the social-networking system 160 may send a user interface to the client device 130 including the query-filter elements "Location", "Friends with a Person", "Work", and "Friends", as well as query filter elements "Gender", "Age/Year Born", "Relationship Status", and "Languages". The user interface may be scrollable to reveal additional query-filter elements. As an example and not by way of limitation, moving between FIG. 6A and FIG. 6B, the user has selected the people query-domain element 602. Note that while the user interface for selecting a particular domain to query is described and illustrated in a particular manner, this disclosure contemplates selecting any suitable domain to query in any suitable manner. FIG. 6B illustrates a first search-results page 606. The first search-results page 606 includes a plurality of query-filter elements 607-609. The "location" query-filter element 607, "friends" query-filter element 608, and "work" query-filter element 609 each correspond to the query-filters "location", "friends", and "work", respectively, that are associated with the people query-domain. The query-filter elements 607-609 are activatable to apply the associated query-filter to the identified objects. The first search-results page 606 also includes an additional-filters element 610. As illustrated on the first search-results page 606, the additional-filters element 610 is a "+" button. The additional-filters element 610 is activatable to generate a user interface including one or more query-filter elements 607-609 and one or more additional filter elements. In particular embodiments, the first search-results page 606 may further include one or more objects (not shown) associated with the people query-domain element 602. The objects may correspond to a second node within a threshold degree of separation of the first user node. Moving to FIG. 6C, the user has selected the additional-filters element 610. FIG. 6C illustrates a user interface 611 including the query-filter elements 607-609 as well as additional query-filter element 612, which corresponds to the "education" query-filter. The user interface 611 also includes an additional-filters element 610. As illustrated on the user interface 611, the additional-filters element 610 is a "More Filters" button. Moving to FIG. 6D, the user has selected the additional-filters element 610. FIG. 6D illustrates another user interface 611, including query-filter elements 607-609, "education" query-filter element 612, and "gender" query-filter element 613, "age/year born" query-filter element 614, "relationship status" query-filter element 615, and "languages" query-filter element 616. As another example and not by way of limitation, FIG. 7A illustrates a first search-results page 701, wherein the user has selected the "photos" query-domain element 603. The first search-results page 701 includes a plurality of query-filter elements 704-706. The "taken by" query-filter element 704, "location" query-filter element 705, and "tagged" query-filter element 706 correspond to the query filters "taken by", "location", and "tagged", respectively, that are associated with the photos query-domain. The query-filter elements 704-706 are activatable to apply the associated query-filter to the identified objects. The first search-results page 701 also includes an "additional-filters" element 610. Moving to FIG. 7B, the user has selected the additional-filters element 610. FIG. 7B illustrates a user interface 710 including query-filter element 704-706 and "date taken" query-filter element 707, "liked or commented on by" query-filter element 708, and "sort by" query-filter element 709. Although this disclosure describes sending a search-results page in a particular manner, this disclosure contemplates sending a search-results page in any suitable manner. Furthermore, although this disclose describes applying particular query filters in a particular manner, this disclosure contemplates applying any suitable query filters in any suitable manner.

Figure 6E:
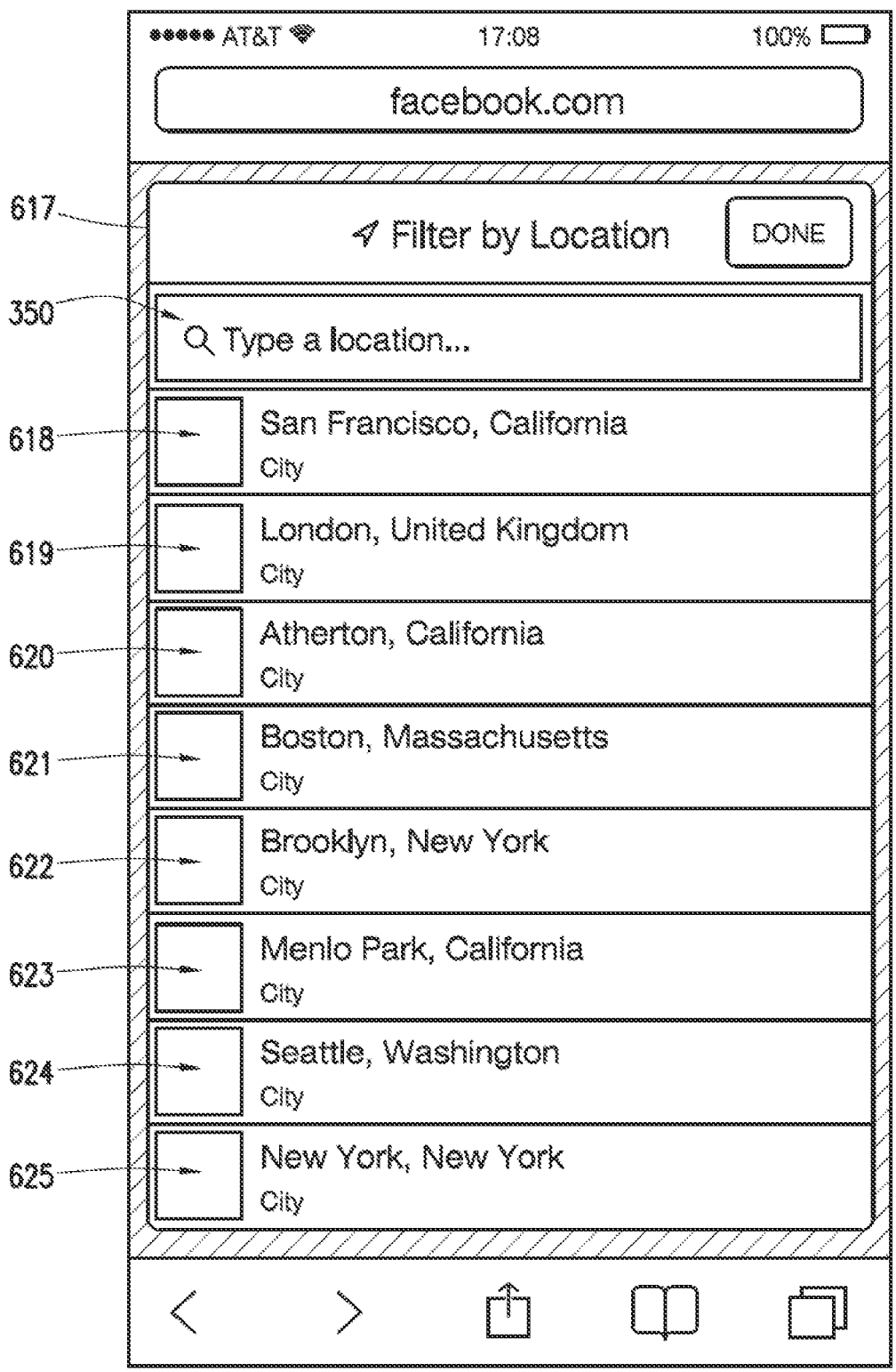
Figure 6F:
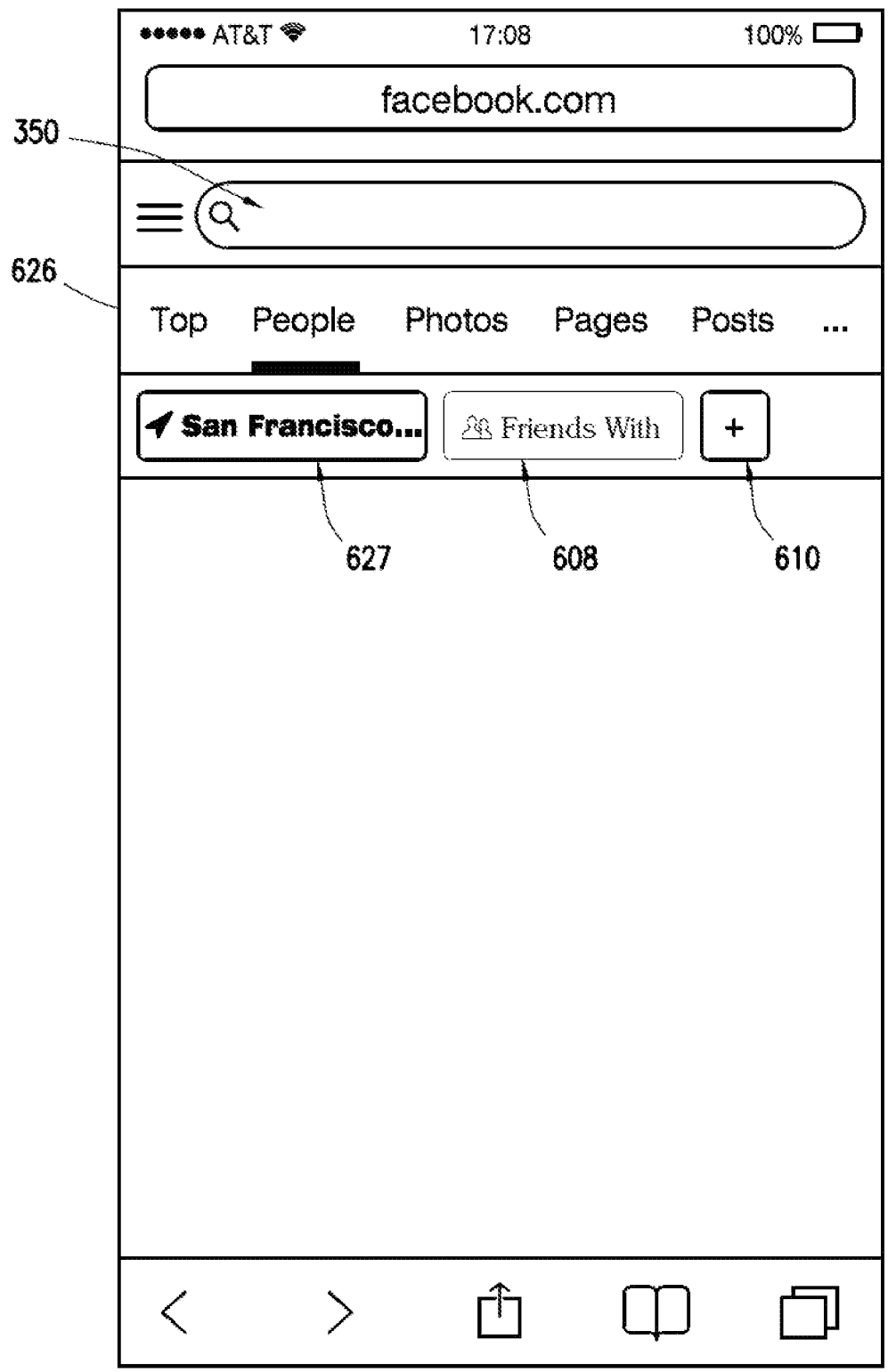
Figure 7C:
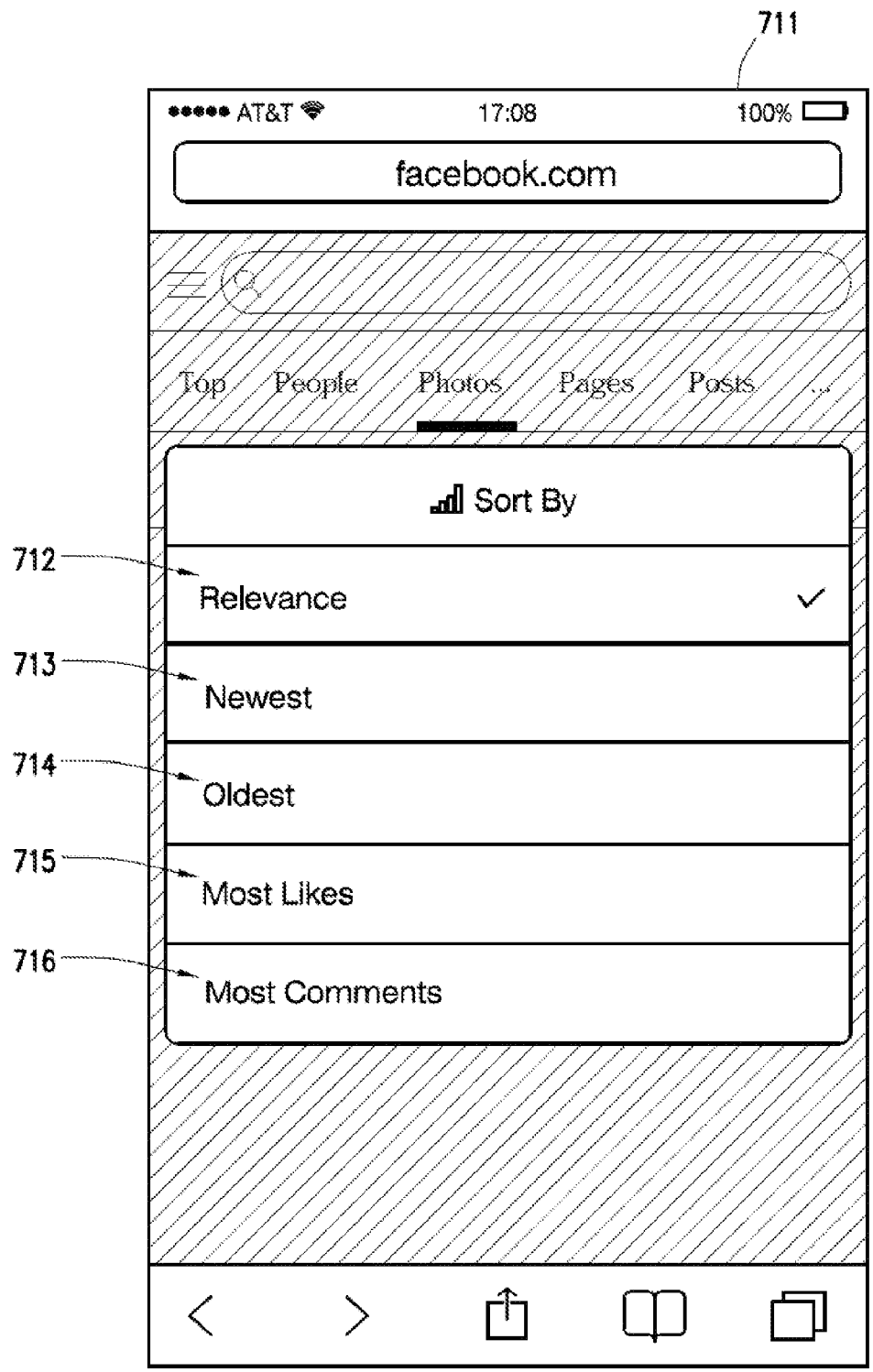

In particular embodiments the social-networking system 160 may send to the client device 130 a sub-filter page. The sub-filter page may include one or more sub-filter elements. Each sub-filter element may correspond to a sub-filter associated with the query filter. The sub-filter page may be sent to the user device 130 responsive to a selection of a query-filter element. As an example and not by way of limitation, in response to the user selecting the query-filter element associated with the query-filter "gender", the social-networking system 160 may send a sub-filter page including the sub-filters "male" and "female". In particular embodiments, the sub-filter page may include a query field 350. In particular embodiments, the social networking system 160, may receive from the client device 130, a text string inputted into the query field. The social-networking system 160 may identify one or more second nodes matching the text string. In particular embodiments, the social-networking system 160 may send, to the client device 130, a user interface including additional query-filter elements. Each additional query-filter element may correspond to one of the identified second nodes matching the text string. The social-networking system 160 may receive, from the client device 130, a third search query including a selection of one or more of the identified second nodes. The third query may be received in response to the first user activating the corresponding additional query-filter elements. As an example and not by way of limitation, in response to the first user selecting the "Location" query-filter, the social-networking system may send to the client device 130 a user interface including query field 350. The user may input "San Francisco" into the query field 350, and the social-networking system may identify concept nodes 204 associated with "San Francisco". The social-networking system may send a user interface including the query-filter element "San-Francisco". In particular embodiments, the sub-filter page may include sub-filters and a query-field 350. As an example and not by way of limitation, if the user selects the query-filter element associated with the query-filter "gender", the social-networking system 160 may send a sub-filter page including the sub-filters "male" and "female", as well as a query field 350. If the user begins typing "a" in the query field 350, the social-networking system 160 may identify filter elements associated with "Agender" and Androgyne". As an example and not by way of limitation, moving between FIG. 6D and FIG. 6E, the user has selected the location query-filter element 607. FIG. 6E illustrates a sub-filter page 617 including a query field 350 and a plurality of sub-filter elements 618-625. The sub-filter elements correspond to a sub-filter associated with the location query-filter. For example, sub-filter element 618 is associated with a "San Francisco, California" sub-filter. Moving to FIG. 6F, the user has selected the San Francisco sub-filter element 618. In particular embodiments, sorting (e.g., relevance, newest) can also be provided as a filtering option. As another example and not by way of limitation, moving between FIG. 7B and FIG. 7C, the user has selected the "sort by" query-filter element 709. FIG. 7C illustrates a sub-filter page 711 including a plurality of sub-filter elements 712-716. The sub-filter page 711 does not include a query field 350. Rather, the sub-filter elements associated with the sort by query-filter element 709 are included in a fixed list of values. In FIG. 7C, the "relevance" sub-filter element 712 is currently selected. Although this disclosure describes sending a sub-filter page in a particular manner, this disclosure contemplates sending a sub-filter page in any suitable manner.

In particular embodiments, social-networking system 160 may receive from the client device 130 a second search query. The second search query may include a selection of one or more of the query-filters in response to the first user activating the corresponding query-filter elements. In other words, from the first search-results page, the user may select one or more query-filter elements, and social-networking system 160 may respond by modifying the search query to apply the newly selected filters. In particular embodiments, the social-networking system 160 may identify, responsive to the second search query, a second set of objects of the plurality of objects matching the first object-type and the selected query filters. The social-networking system 160 may send to the client device 130 a second search-results page. The second search-results page may include one or more of the identified objects form the second set of objects. As an example and not by way of limitation, social-networking system 160 may receive a search query for </search/users/me/friends> (which is a query syntax used to search for users who are friends of the querying user (i.e., "me")) in response to the first user selecting the "People" query-domain and additionally selecting the "friends" query-filter. The social-networking device may identify user nodes 202 corresponding with user's "John Smith" and "Jane Doe", each of whom may be connected to the first user by a friend edge 206. The social-networking system may send to the client device 130 a second search-results page including "John Smith" and "Jane Doe". Conversely, a user "John Doe" may have been connected the user by two degrees of freedom (e.g., a friend of a friend); since "John Doe" is not connected to the user by a "friend" edge 206, "John Doe" will be excluded from the current search. In particular embodiments, the second search-results page may include one or more query-filter elements, each corresponding to a query-filter associated with the first query-domain. The query-filter elements may be activatable to further apply the associated query filters to the identified objects. As such, the user can simply activate more query-filter elements to apply multiple query filters to a search query to further refine a search query. In particular embodiments, the social-networking system 160 may generate a structured query based on the second search query. The structured query may include references to one or more selected nodes from the plurality of second nodes and one or more selected edges from the plurality of edges. Each of the selected nodes and selected edges may correspond to one or more of the first query-domain or one or more query-filters of the second search query. The social-networking system 160 may send the structured query to the client device 230 for display to the first user. In particular embodiments, the structured query may be based on a natural-language string generated by a grammar model. As an example and not by way of limitation, the user may selected the "People" query-domain and additionally select the "friends" and "Palo Alto" query-filters. The social-networking system may generate the structured query "My friends that live in Palo Alto" based on the query-domain and query-filters selected by the user. FIG. 6F illustrates a search results page 626, including a query field 350, query-filter element 608, and additional-filters element 610. The search-results page 626 also includes an icon 627 indicating that the San Francisco sub-filter element 618 has been selected. In particular embodiments, the search-results page 626 also includes one or more objects (not shown) associated with the people query-domain element 602 and limited by the San Francisco sub-filter element 618. In particular embodiments, as the user adds additional query filters (e.g., friends or work) the search-results page 626 will update to include one or more objects (not shown) associated with the people query-domain element 602 and limited by each of the selected filter and/or sub-filter elements. As such, a user can continually refine his or her search by selecting/un-selecting particular filters until he or she finds the desired object. Although this disclosure describes receiving a second search query in a particular manner, this disclosure contemplates second search query in any suitable manner.

Figure 8:
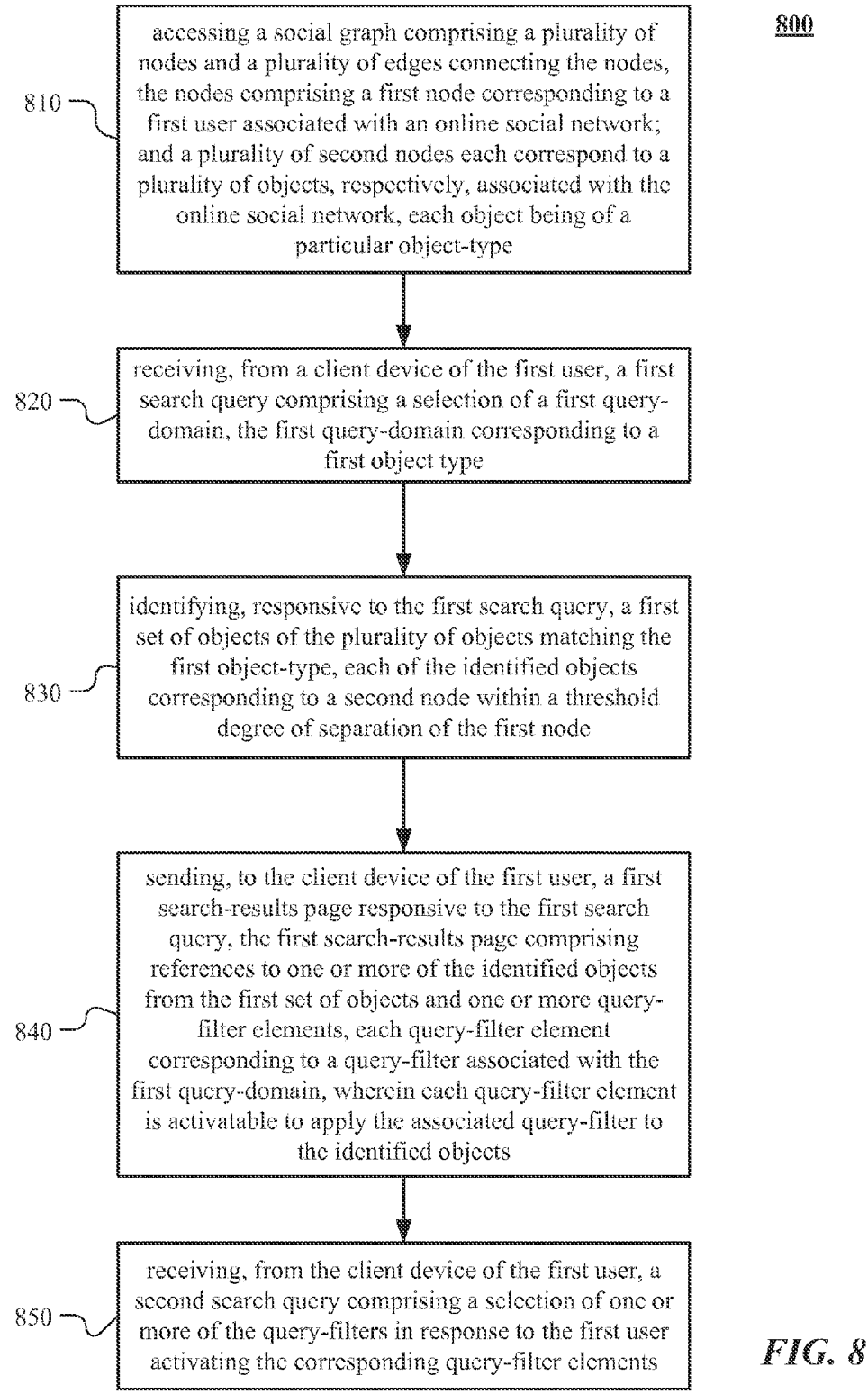
FIG. 8 illustrates an example method for constructing queries using filters.

FIG. 8 illustrates an example method 800 for constructing queries using query filters. The method may begin at step 810, where social-networking system 160 may access a social graph including a plurality of nodes and a plurality of edges connecting the nodes. The nodes may include a first node corresponding to a first user associated with an online social network, and a plurality of second nodes each correspond to a plurality of objects, respectively, associated with the online social network, each object being of a particular object-type. At step 820, social-networking system 160 may receive, from a client device of the first user, a first search query including a selection of a first query-domain corresponding to a first object type. The selection of the first-query domain may occur at a query-initiation page. In particular embodiments, the first user may also select one or more query-filter elements from the query-initiation page. At step 830, social-networking system 160 may identify, responsive to the first search query, a first set of object of the plurality of objects matching the first object-type. Each of the identified objects may correspond to a second node within a threshold degree of separation of the first node. At step 840, social-networking system 160 may send, to the client device of the first user, a first search-results page responsive to the first search query. The first search-results page may include references to one or more of the identified objects from the first set of objects and one or more query-filter elements. Each query-filter element may correspond to a query-filter associated with the first query-domain. Each query-filter element may be activatable to apply the associated query-filter to the identified objects. At step 850, social-networking system 160 may receive, from the client device of the first user, a second search query including a selection of one or more of the query-filters in response to the first user activating the corresponding query-filter elements. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for constructing queries using query filters including the particular steps of the method of FIG. 8, this disclosure contemplates any suitable method for constructing queries using query filters including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 9:
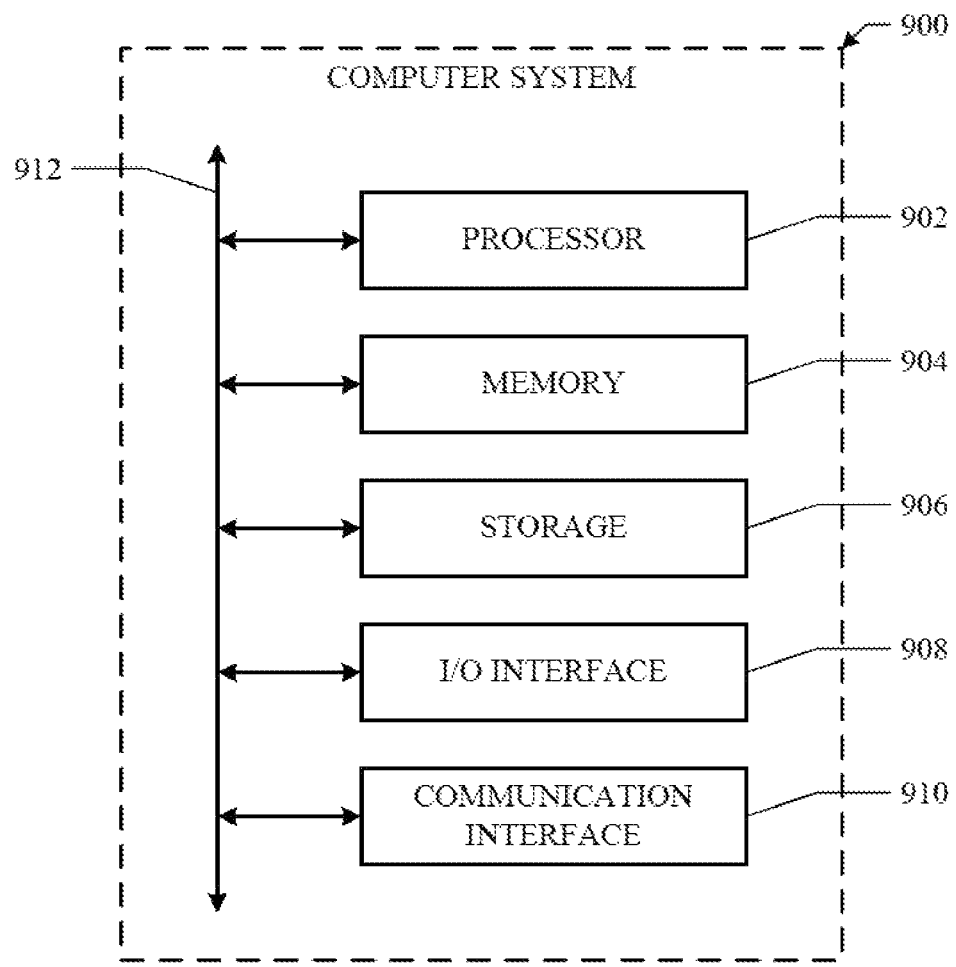
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A method comprising, by one or more computing devices:
    accessing a social graph comprising a plurality of nodes and a plurality of edges connecting the nodes, the nodes comprising:
        a first node corresponding to a first user associated with an online social network; and a plurality of second nodes each corresponding to a plurality of objects, respectively, associated with the online social network, each object being of a particular object-type;

receiving, from a client device of the first user, a first search query comprising a selection of a first query-domain, the first query-domain corresponding to a first object-type;

identifying, responsive to the first search query, a first set of objects of the plurality of objects matching the first object-type, each of the identified objects corresponding to a second node within a threshold degree of separation of the first node;

sending, to the client device of the first user, a first search-results page responsive to the first search query, the first search-results page comprising references to one or more of the identified objects from the first set of objects and one or more query-filter elements, each query-filter element corresponding to a query-filter associated with the first query-domain, wherein each query-filter element is activatable to apply the associated query-filter to the identified objects; and receiving, from the client device of the first user, a second search query comprising a selection of one or more of the query-filters in response to the first user activating the corresponding query-filter elements.

2. The method of claim 1, further comprising:
sending, to the client device of the first user, a query-initiation page responsive to a selection of a query field by the first user, the query-initiation page comprising one or more query-domain elements corresponding to one or more query-domains, respectively, wherein each query-domain element is activatable to generate a search query comprising a selection of the associated query-domain.

3. The method of claim 2, wherein receiving the first search query comprises receiving an indication the first user has activated a first query-domain element corresponding to the first query-domain.

4. The method of claim 1, wherein the first search-results page further comprises an additional-filters element, wherein the additional-filters element is activatable to generate a user interface comprising the one or more query-filter elements of the first search-results page and one or more additional query-filter elements, each query-filter element corresponding to a query-filter associated with the first query-domain, wherein each query-filter element is activatable to apply the associated query-filter to the identified objects.

5. The method of claim 1, wherein the threshold degree of separation is one, two, three, or all.

6. The method of claim 1, further comprising:
identifying, responsive to the second search query, a second set of objects of the plurality of objects matching the first object-type and the selected query-filters; and
sending, to the client device of the first user, a second search-results page responsive to the second search query, the second search-results page comprising references to one or more of the identified objects from the second set of objects.

7. The method of claim 6, wherein the second search-results page further comprises one or more query-filter elements, each query-filter element corresponding to a query-filter associated with the first query-domain, wherein each query-filter element is activatable to apply the associated query-filter to the identified objects.

8. The method of claim 1, wherein the first object-type is selected from a group consisting of: users, photos, posts, pages, applications, events, locations, or user groups.

9. The method of claim 1, wherein identifying a first set of objects of the plurality of objects matching the first object-type comprises searching a vertical storing a plurality of objects of the first object-type to identify a plurality of objects in the vertical that correspond to a second node within a threshold degree of separation of the first node.

10. The method of claim 9, wherein the vertical is one of a plurality of verticals, and wherein each vertical of the plurality of verticals stores objects of a particular object-type, the particular object-type being selected form a group consisting of: users, photos, posts, pages, applications, events, locations, or user groups.

11. The method of claim 1, wherein the method further comprises sending, to the client device of the first user and responsive to a selection of a query-filter element, a sub-filter page, the sub-filter page comprising one or more sub-filter elements, each sub-filter element corresponding to a sub-filter associated with the query filter.

12. The method of claim 1, wherein the method further comprises sending, to the client device of the first user and responsive to a selection of a query-filter element, a sub-filter page comprising a query field.

13. The method of claim 12, further comprising:
receiving, from the client device of the first user, and text string inputted into the query field; and
identifying one or more second nodes matching the text string.

14. The method of claim 13, further comprising:
sending, to the client device of the first user, a user interface comprising additional query-filter elements, each additional query-filter element corresponding to one of the identified second nodes matching the text string; and
receiving, from the client device of the first user, a third search query comprising a selection of one or more of the identified second nodes in response to the first user activating the corresponding additional query-filter elements.

15. The method of claim 1, further comprising:
generating a structured query based on the second search query, wherein the structured query comprises references to one or more selected nodes from the plurality of second nodes and one or more selected edges from the plurality of edges, each selected node and selected edge corresponding to one or more of the first query-domain or the one or more query-filters of the second search query; and
sending, to the client device of the first user, the structured query for display to the first user.

16. The method of claim 1, wherein the structured query is based on a natural-language string generated by a grammar model.

17. The method of claim 1, wherein the search-results page is a user interface of a native application associated with the online social network on the client system of the first user.

18. The method of claim 1, wherein the search-results page is a webpage of the online social network accessed by a browser client of the client system of the first user.

19. One or more computer-readable non-transitory storage media embodying software that is operable when executed to:

access a social graph comprising a plurality of nodes and
   a plurality of edges connecting the nodes, the nodes
   comprising:
   a first node corresponding to a first user associated with
      an online social network; and
   a plurality of second nodes each corresponding to a
      plurality of objects, respectively, associated with the
      online social network, each object being of a particular object-type;
receive, from a client device of the first user, a first search
   query comprising a selection of a first query-domain,
   the first query-domain corresponding to a first object-type;
identify, responsive to the first search query, a first set of
   objects of the plurality of objects matching the first
   object-type, each of the identified objects corresponding to a second node within a threshold degree of
   separation of the first node;
send, to the client device of the first user, a first search-results page responsive to the first search query, the first
   search-results page comprising references to one or
   more of the identified objects from the first set of
   objects and one or more query-filter elements, each
   query-filter element corresponding to a query-filter
   associated with the first query-domain, wherein each
   query-filter element is activatable to apply the associated query-filter to the identified objects; and
receive, from the client device of the first user, a second
   search query comprising a selection of one or more of
   the query-filters in response to the first user activating
   the corresponding query-filter elements.

20. A system comprising: one or more processors; and a memory coupled to the processors comprising instructions executable by the processors, the processors being operable when executing the instructions to:
   access a social graph comprising a plurality of nodes and
      a plurality of edges connecting the nodes, the nodes
      comprising:
      a first node corresponding to a first user associated with
         an online social network; and
      a plurality of second nodes each corresponding to a
         plurality of objects, respectively, associated with the
         online social network, each object being of a particular object-type;
   receive, from a client device of the first user, a first search
      query comprising a selection of a first query-domain,
      the first query-domain corresponding to a first object-type;
   identify, responsive to the first search query, a first set of
      objects of the plurality of objects matching the first
      object-type, each of the identified objects corresponding to a second node within a threshold degree of
      separation of the first node;
   send, to the client device of the first user, a first search-results page responsive to the first search query, the first
      search-results page comprising references to one or
      more of the identified objects from the first set of
      objects and one or more query-filter elements, each
      query-filter element corresponding to a query-filter
      associated with the first query-domain, wherein each
      query-filter element is activatable to apply the associated query-filter to the identified objects; and
   receive, from the client device of the first user, a second
      search query comprising a selection of one or more of
      the query-filters in response to the first user activating
      the corresponding query-filter elements.

* * * * *